United States Patent
Mori

[11] Patent Number: 6,107,413
[45] Date of Patent: Aug. 22, 2000

[54] PROCESS FOR PRODUCING FLAME-RETARDANT, SILANE-CROSSLINKED POLYOLEFIN

[75] Inventor: Tsuneharu Mori, Tokyo, Japan

[73] Assignee: Sumitomo Bakelite Company Limited, Tokyo, Japan

[21] Appl. No.: 09/077,545

[22] PCT Filed: Dec. 20, 1996

[86] PCT No.: PCT/JP96/03734

§ 371 Date: Jun. 1, 1998

§ 102(e) Date: Jun. 1, 1998

[87] PCT Pub. No.: WO97/24401

PCT Pub. Date: Jul. 10, 1997

[30] Foreign Application Priority Data

Dec. 27, 1995 [JP] Japan .................................. 7-340387

[51] Int. Cl.⁷ .............................. C08F 30/08; C08K 9/06
[52] U.S. Cl. ...................... 525/342; 525/326.5; 524/269; 524/436; 526/279
[58] Field of Search ................. 525/342, 326.5; 524/269, 436; 526/279

[56] References Cited

U.S. PATENT DOCUMENTS

| | | | |
|---|---|---|---|
| 4,732,939 | 3/1988 | Hoshi et al. | 525/106 |
| 4,814,130 | 3/1989 | Shiromatsu et al. | 264/83 |
| 5,025,042 | 6/1991 | Yoshida et al. | 523/216 |

FOREIGN PATENT DOCUMENTS

| | | |
|---|---|---|
| 0212630A | 3/1987 | European Pat. Off. . |
| 0365289A | 4/1990 | European Pat. Off. . |
| 3150808A | 6/1983 | Germany . |
| 5964653 | 4/1984 | Japan . |
| 6337145 | 2/1988 | Japan . |
| 1206509 | 8/1989 | Japan . |
| 4335055 | 1/1992 | Japan . |
| 4149238 | 5/1992 | Japan . |
| 532850 | 2/1993 | Japan . |
| 6136066 | 5/1994 | Japan . |
| 2188640A | 10/1987 | United Kingdom . |

OTHER PUBLICATIONS

JP-A- 62-059667 (Derwent Abstract) Mar. 16, 1987.

Primary Examiner—James J. Seidleck
Assistant Examiner—Olga Asinovsky
Attorney, Agent, or Firm—Smith Gambrell & Russell, LLP

[57] ABSTRACT

A process for producing a flame-retardant, silane-crosslinked polyolefin, characterized by melt-mixing a flame-retardant polyolefin consisting of an α-olefin polymer, a flame-retardant, a water-absorbing agent and a silanol-condensing catalyst with a substantially water-free carrier polymer comprising an organic unsaturated silane and a free-radical generator at a higher temperature than the crystalline melting point of the base polymer of the flame-retardant polyolefin to subject them to reaction and then contacting the reaction mixture with water to subject the reaction mixture to crosslinking.

6 Claims, No Drawings

PROCESS FOR PRODUCING FLAME-RETARDANT, SILANE-CROSSLINKED POLYOLEFIN

TECHNICAL FIELD

This invention relates to a silane-crosslinking process for producing a flame-retardant, silane-crosslinked polyolefin in one step using a carrier polymer containing an organic unsaturated silane or the like at a high concentration in the silane-crosslinking of a flame-retardant polyolefin containing a silanol-condensing catalyst and a flame-retardant.

BACKGROUND ART

In order to impart a flame-retardancy to a polyolefin composition which has been often used in coating wires, cables and the like; hoses; sheets; injection moldings; and the like, a halogen compound and diantimony trioxide have heretofore been added to the polyolefin to achieve the flame-retardancy. However, these compositions are halogen-containing compositions, so that halogen gases, which are not only harmful in themselves but also the cause of metal corrosion, are generated when they are burned. Therefore, these compositions have not been desired. In addition, the amount of smoke generated is large, the visibility becomes bad and the people have been markedly prevented from taking refuge from a fire and from fighting a fire.

In particular, from a safety aspect, it has recently been strongly required that such a halogen-containing gas be not generated. Under such circumstances, attention has been paid to an inorganic flame-retardant using a hydrated metal compound which generates very little fumes and is not substantially harmful.

In recent years, a resin composite containing magnesium hydroxide, aluminum hydroxide or the like has been put to practical use for imparting flame-retardancy; however, these flame-retardant resin compositions can prevent the generation of halogen-containing gases but have a problem in that there is caused a so-called drip phenomenon that the resin compositions melt and drip during the firing or in that the resin compositions are inferior in shape-retainability at high temperatures.

In order to improve the flame-retardancy and also the heat resistance to solve the above problem, there is a method of crosslinking the resin, and this is disclosed in, for example, JP-B-57-24373, JP-B-57-26620 and the like. However, the method described therein requires a large scale crosslinking apparatus for chemical crosslinking, crosslinking with electron beams or the like and hence the cost of the equipment per se and the expenses for subsequent operation, maintenance, control and the like of the apparatus are increased, resulting in an increase of the cost of the composition. Furthermore, as stated in JP-A-60-101129 and JP-A-60-147463, in the case of a flame-retardant, crosslinked composition characterized in that a flame-retardant is added to a silane-grafted polyolefin resin and this silane-grafted polyolefin resin is finally crosslinked, only the silane-grafted polyolefin resin whose crosslinking has been controlled has been able to be used for preventing premature crosslinking in blending and kneading the flame-retardant with the silane-grafted polyolefin resin. As a result, it has been impossible to increase the degree of crosslinking of the silane-grafted polyolefin resin and hence the heat resistance has been insufficient.

The above method requires at least two reaction steps, namely, the silane-grafting reaction step and the silanol-condensing reaction step. Accordingly, at least two extrusion steps must be carried out and an economical difficulty of the final product is unavoidable.

Furthermore, the Monosil TM process method is known as a one-step process. However, this method requires a liquid-adding means for injecting an organic unsaturated silane in the form of a liquid into an extruder and has problems of slippage and metering failure. The extruder is also required to have a large L/D and be of an expensive and special type for uniformly dispersing a small amount of an additive, and hence, an economical problem is unavoidable. In addition, a very sophisticated technique is necessary for the extrusion and hence there have been no commercialized method for flame-retardant type.

In addition, JP-A-3-167229 discloses, as a one-step process, a silane-crosslinking method in which a silane has been introduced into a solid carrier polymer. However, this method uses a porous polymer or EVA as the solid carrier polymer, and in this method, in addition to the silane and the free-radical generator, an additive such as a silanol-condensing catalyst, an antioxidant or the like is also introduced into the solid carrier polymer. Therefore, an oligomer is formed by condensation of the silane or the crosslinking is inhibited by trapping the radical, whereby such problems are caused that crosslinking efficiency and storability are inferior. In said Japanese publication, no flame-retardant type is mentioned.

This invention has solved these problems and aims at providing a silane-crosslinking method comprising silane-crosslinking a flame-retardant polyolefin containing a silanol-condensing catalyst and a flame-retardant, wherein a flame-retardant, silane-crosslinked polyolefin is produced in one step using a carrier polymer containing an organic unsaturated silane or the like at a high concentration.

DISCLOSURE OF THE INVENTION

This invention is a process for producing a flame-retardant, silane-crosslinked polyolefin which comprises melt-mixing (1) a flame-retardant polyolefin comprising 100 parts by weight of an α-olefin homopolymer or copolymer having a density of not more than $0.92 \text{ g/cm}^3$, 50 to 200 parts by weight of a flame-retardant, 0.5 to 10 parts by weight of a water-absorbing agent and a catalytic amount of a silanol-condensing catalyst with (2) a substantially water-free carrier polymer comprising a free-radical generator and an organic unsaturated silane represented by the general formula $RR'SiY_2$ in which R is a monovalent olefinically unsaturated hydrocarbon group; Y is a hydrolyzable organic group; and R' is a monovalent hydrocarbon group other than the olefinically unsaturated hydrocarbon group or the same as Y, at a higher temperature than the crystalline melting point of the base polymer of the flame-retardant polyolefin to subject them to reaction; subsequently, contacting the reaction mixture with water to subject the reaction mixture to crosslinking. Preferably, this invention provides the above process for producing a flame-retardant, silane-crosslinked polyolefin, characterized in that the α-olefin homopolymer or copolymer is a homopolymer of an α-olefin such as ethylene, propylene or the like, or a crystalline, block or random copolymer of an α-olefin with at least one other α-olefins, or a copolymer of a major amount of an α-olefin with a minor amount of at least one polar monomer selected from vinyl acetate, maleic anhydride, acrylic acid and the like or a mixture of them and has a density of not more than $0.92 \text{ g/cm}^3$; the carrier polymer is a polymer selected from the group consisting of an ethylene-ethyl acrylate copolymer (EEA), an ethylene-methyl methacrylate copolymer (EMMA), a hydrogenated block copolymer obtained by hydrogenating a block copolymer consisting of at least one polymer block comprising mainly a vinyl aromatic compound and at least one polymer block comprising mainly a conjugated diene compound and a mixture of them; the amount of the carrier polymer added is 1 to 5% by weight; the flame-retardant is a magnesium hydroxide or aluminum hydroxide surface-treated with at least one silane-coupling agent, a silicone derivative, a fatty acid or a metal salt of a fatty acid; and the water-absorbing agent is quicklime having an average particle size of 1 to 5 $\mu$m surface-treated with at least one silane-coupling agent, a silicone derivative, a fatty acid or a metal salt of a fatty acid.

This invention is explained below in detail.

The $\alpha$-olefin homopolymer or copolymer used in this invention is a homopolymer of an $\alpha$-olefin such as ethylene, propylene or the like; a crystalline, block or random copolymer of an $\alpha$-olefin with at least one other $\alpha$-olefin, for example, a crystalline propylene-ethylene block copolymer, an ethylene-butene-1 random copolymer or a propylene-butene-1 random copolymer; a copolymer of a major amount of an $\alpha$-olefin with a minor amount of at least one polar monomer such as vinyl acetate, maleic anhydride, acrylic acid or the like (including graft copolymers); or a mixture thereof, and has a density of not more than 0.92 g/cm$^3$. When the density exceeds 0.92 g/cm$^3$, the compatibility of the flame-retardant with the $\alpha$-olefin homopolymer or copolymer becomes inferior and the flame-retardancy becomes low.

The flame-retardant used in this invention is a compound having a decomposition-starting temperature in the range of from 150° C. to 450° C. and represented by the general formula $M_mO_n \cdot XH_2O$ in which M is a metal, m and n are integers of 1 or more determined by the valency of the metal M and X is a numeral showing the crystal water content, or a double salt containing said compound. Specific examples of said compound include aluminum hydroxide ($Al_2O_3 \cdot 3H_2O$ or $Al(OH)_3$), magnesium hydroxide ($MgO \cdot H_2O$ or $Mg(OH)_2$), calcium hydroxide ($CaO \cdot H_2O$ or $Ca(OH)_2$), barium hydroxide ($BaO \cdot H_2O$ or $BaO \cdot 9H_2O$), zirconium oxide hydrate ($ZrO \cdot nH_2O$), tin oxide hydrate ($SnO \cdot H_2O$), basic magnesium carbonate ($3MgCO_3 \cdot Mg(OH)_2 \cdot 3H_2O$), hydrotalcite ($6MgO \cdot Al_2O_3H_2O$), dawsonite ($Na_2CO_3 \cdot Al_2O_3 \cdot nH_2O$) and borax ($Na_2O \cdot B_2O_5 \cdot 5H_2O$), and also include zinc borate, zinc metaborate, barium metaborate, zinc carbonate, calcium magnesium carbonate, calcium carbonate, barium carbonate, molybdenum oxide, red phosphorus, triethyl phosphate, tricresyl phosphate, triphenyl phosphate, cresylphenyl phosphate, octyldiphenyl phosphate, ethyl diethylenephosphate, butyl dihydroxypropylenephosphate, disodium ethylenephosphate, ammonium polyphosphate, melamine phosphate, guanidine phosphate and the like. These may be used alone or in combination of two or more, and magnesium hydroxide and aluminum hydroxide are preferred.

The flame-retardant is preferably one surface-treated with (i) a silane coupling agent, (ii) a silicone derivative, (iii) a fatty acid, (iv) a metal salt of a fatty acid, or the like.

The silane-coupling agent (i) is one having, at one end of the molecule, a reactive group (methoxy group, ethoxy group, carboxyl group, cellosolve group or the like) which reacts with an inorganic material, and generally, this has a trifunctional group in many cases; however, those having a difunctional or monofunctional group as the above reactive group may also be used. At the other end, said silane-coupling agent has a reactive group (vinyl group, epoxy group, methacryl group, amino group, mercapto group or the like) which chemically bonds to the resin side which is an organic material, and the skeleton of the main chain thereof is an alkoxyoligomer.

The silicone derivative (ii) is of such a type that a part of the methyl group of dimethylpolysiloxane has been replaced by various organic groups, and the various modifying organic groups include a wide variety of modifying group derivatives, for example, modifying groups for the purpose of improving compatibility, hydrophilic property, lubricity, water-repellency and the like such as $\alpha$-methylstyrene group, $\alpha$-olefin group, polyether group, alcohol group, fluoroalkyl group and the like; modifying groups for the purpose of improving the reactivity and moisture-absorptivity such as amino group, mercapto group, epoxy group, carboxyl group and the like; modifying groups for the purpose of releasing and lustering which has been substituted by a higher fatty acid, carnauba wax and an amide; and the like.

The fatty acid (iii) includes saturated and unsaturated fatty acids having 6 to 22 carbon atoms, and specifically, stearic acid and oleic acid which have 18 carbon atoms are mentioned.

The metal salt (iv) of a fatty acid includes metal soap in which the above-mentioned fatty acids are bonded to metals, and specifically, sodium stearate, potassium stearate, sodium oleate, potassium oleate and the like are mentioned. Of course, the fatty acid may be of linear chain saturated type or unsaturated type, and those in which the side chain portion is bonded to the metal are, of course, effective.

When the flame-retardant surface-treated with one of (i) to (iv) or a mixture thereof is blended in an amount of 50 parts by weight to 200 parts by weight, it is compatible with or reacts with a low crystallinity polymer having a low density, and even when a large amount thereof is blended, it is possible to easily form a composition excellent in low-temperature characteristics, flexibility and processability. However, when the amount is less than 50 parts by weight, the flame-retarding effect thereof is remarkably lowered. When the amount exceeds 200 parts by weight, the flame-retardancy is remarkably increased, but the mechanical characteristics including flexibility, low-temperature characteristics and the like are deteriorated and the processability becomes extremely bad.

The water-absorbing agent used in this invention is quicklime (calcium oxide), magnesium oxide, barium oxide, aluminum oxide, magnesium-aluminum-oxide, magnesium-aluminum-hydroxide-carbonate, silica gel, calcium sulfate anhydride or copper sulfate anhydride. Quicklime is preferred, and those surface-treated with the above (i) to (iv) components or a mixture thereof are more preferable. This water-absorbing agent is added to reduce the amount of water attached to the flame-retardant polyolefin. This is because when water is attached to the flame-retardant polyolefin, premature crosslinking is caused in the silane-crosslinking step. The amount of water causing this premature crosslinking is about 100 ppm or more, and in order to control the amount of water attached to less than 100 ppm, the water-absorbing agent must be added in an amount of 0.5 to 10 parts by weight. When the amount is less than 0.5 part by weight, the amount of water attached becomes 100 ppm or more and premature crosslinking is caused. Even if quicklime is used in an amount of more than 10 parts by weight, the effect of reducing the amount of water attached is not increased and rather deterioration of mechanical characteristics is caused in some cases. In order to make the dispersibility in the flame-retardant polyolefin better and obtain a more uniform effect of absorbing water attached, a water-absorbing agent having an average particle size of 1 to 5 μm is preferable.

The silanol-condensing catalyst used in this invention includes organometallic compounds such as dibutyltin dilaurate, stannous acetate, dibutyltin diacetate, dibutyltin dioctoate, lead naphthenate, zinc caprylate, cobalt naphthenate, tetrabutyl titanate, lead stearate, zinc stearate, cadmium stearate, barium stearate, calcium stearate and the like. The amount of the organometallic compound added is 0.01 to 0.1% by weight, preferably 0.03 to 0.07% by weight, based on the total weight of the flame-retardant, silane-crosslinked polyolefin. When the amount is less than 0.01% by weight, the crosslinking reaction does not proceed sufficiently, and when the amount is more than 0.1% by weight, crosslinking proceeds locally in an extruder when the composition is extruded and the appearance is extremely deteriorated. The silanol-condensing catalyst must be incorporated into the flame-retardant polyolefin. This is because when the silanol-condensing catalyst is incorporated into the carrier polymer impregnated with the organic unsaturated silane or free-radical generator, the formation of an oligomer due to the condensation of the silane is accelerated and the appearance is deteriorated.

The organic unsaturated silane used in this invention is grafted on a base resin for forming mutual crosslinking sites of the base resins. The organic unsaturated silane used in this invention is a compound represented by the general formula $RR'SiY_2$ in which R is a monovalent olefinically unsaturated hydrocarbon group, Y is a hydrolyzable organic group and R' is a monovalent hydrocarbon group other than olefinically unsaturated hydrocarbon groups or is the same as Y.

It is preferable to use an organic unsaturated silane represented by the general formula $RSiY_3$ which is the case where R' is the same as Y, and there can be used, for example, vinyltrimethoxysilane, vinyltriethoxysilane, vinyltributoxysilane, allyltrimethoxysilane, allyltriethoxysilane and the like. The amount of the organic unsaturated silane added is 0.1 to 2% by weight, preferably 0.4 to 1% by weight, based on the total weight of the flame-retardant, silane-crosslinked polyolefin. When the amount is less than 0.1% by weight, a sufficient grafting is not caused and when the amount is more than 2% by weight, molding failure is caused and the process becomes uneconomical.

The free-radical generator used in this invention serves as an initiator for silane-grafting reaction. The free-radical generator used in this invention includes various organic peroxides and peresters having a strong polymerization-initiating action, and there are specifically mentioned, for example, dicumyl peroxide, α,α'-bis(t-butylperoxydiisopropyl)benzene, di-t-butyl peroxide, t-butylcumyl peroxide, dibenzoyl peroxide, 2,5-dimethyl-2, 5-bis(t-butylperoxy)hexane, t-butyl peroxypi-valate, t-butyl peroxy-2-ethylhexanoate and the like. The amount of the free-radical generator added is 0.01 to 0.1% by weight, preferably 0.02 to 0.05% by weight, based on the total weight of the flame-retardant, silane-crosslinked polyolefin. When the amount is less than 0.01% by weight, the silane-grafting reaction does not proceed sufficiently and when the amount is more than 0.1% by weight, the extrusion-processability is deteriorated and the mold surface becomes bad.

By swelling the carrier polymer used in this invention with a liquid mixture in which the free-radical generator is dissolved in the silane, the free-radical generator and the silane can be incorporated into the carrier polymer. At this time, for the incorporation at a high concentration, it is necessary to preheat the carrier polymer. However, the preheating must be effected at a temperature not higher than the crystalline melting point so that the polymer is not melted. This is because when the preheating is effected at a temperature higher than the crystalline melting point, pellets are melted and the workability is impeded thereby.

In addition, the carrier polymer must be in the form of particles and must be a solid compatible with the flame-retardant polyolefin and the silane. The compatibility referred to herein means that the carrier polymer must not easily react with the silane and must be dispersible or soluble in the flame-retardant polyolefin. Suitable carrier polymers are non-moisture-absorbable. That is, it is preferable that the absorption of water is relatively slow in order to minimize the possibility of premature hydrolysis and condensation of the silane. In any case, substantially no water should be present in the carrier polymer. The carrier polymer used in this invention is usually in the form of granules or pellets, and pellets are preferred.

The carrier polymer used in this invention includes, for example, ethylene-ethyl acrylate copolymer (EEA), ethylene-methyl methacrylate copolymer (EMMA), ethylene-vinyl acetate copolymer (EVA), ethylene-propylene copolymer (EPR), ethylene-propylene-diene copolymer (EPDM), a hydrogenated block copolymer obtained by hydrogenating a block copolymer consisting of at least one polymer block comprising mainly a vinyl aromatic compound and at least one polymer block comprising mainly a conjugated diene compound such as hydrogenated styrene-isoprene block copolymer (SEPS), hydrogenated styrene-butadiene block copolymer (SEBS) or the like, and mixtures thereof.

The amount of the carrier polymer added is 1 to 5% by weight based on the total weight of the flame-retardant, silane-crosslinked polyolefin. When the amount is less than 1% by weight, no sufficient grafting is caused, and when the amount is more than 5% by weight, molding failure is caused and the process is not economical.

The flame-retardant polyolefin may, if necessary, have added thereto as other additives, conventional additives such as antioxidant, neutralizing agent, ultra-violet absorber, anti-static agent, pigment, dispersant, viscosity improver, metal deterioration inhibitor, fungicide, fluidity-controlling agent and the like, and may further contain other synthetic resins.

Incidentally, in this invention, the silanol-condensing catalyst is added to the base polymer; however, in order to make the degree of dispersion of the silanol-condensing catalyst better, there may be used a carrier polymer other than the carrier polymer impregnated with the above-mentioned organic unsaturated silane and free-radical initiator, for example, a previously melt-mixed mixture of a polyolefin resin with a silanol-condensing catalyst. In this case, it follows that the base polymer and two kinds of carrier polymers are introduced into a molding machine such as an extruder or the like in a suitable blending proportion.

BEST MODE FOR CARRYING OUT THE INVENTION

Examples are shown below to explain this invention in more detail.

<<Production of flame-retardant polyolefin>>

According to the compounding proportions shown in Table 1, all the components shown in Table 1 were mixed and kneaded at a temperature of 160–180° C. using a Banbury mixer to be pelletized.

<<Production of carrier polymer>>

According to the compounding proportions shown in Table 2, first of all, the carrier polymer was introduced into a super mixer and stirred and mixed and then preheated to 80° C. Subsequently, a liquid mixture obtained by dissolving a free-radical initiator in an unsaturated silane was introduced into a super mixer and the carrier polymer was impregnated with the liquid mixture with stirring in 10 minutes.

TABLE 1

| Ingredients | N1 | N2 | N3 | N4 | N5 | N6 | N7 | N8 | N9 | N10 |
|---|---|---|---|---|---|---|---|---|---|---|
| D9052 | 100 | 50 | | 50 | 50 | 50 | 50 | 50 | 100 | 100 |
| P-0480 | | 50 | 100 | 50 | 50 | 50 | 50 | 50 | | |
| Magnesium hydroxide | 120 | 120 | | 30 | 250 | 120 | 120 | 120 | 120 | 120 |
| Aluminum hydroxide | | | 120 | | | | | | | |
| Quicklime (1) | 5 | 5 | 5 | 5 | 5 | | 20 | | 5 | 5 |
| Quickline (2) | | | | | | | | 5 | | |
| DBTDL | 0.09 | 0.09 | 0.09 | 0.09 | 0.09 | 0.09 | 0.09 | 0.09 | 0.005 | 0.4 |
| Antioxidant | 2 | 2 | 2 | 2 | 2 | 2 | 2 | 2 | 2 | 2 |
| Lubricant | 0.5 | 0.5 | 0.5 | 0.5 | 0.5 | 0.5 | 0.5 | 0.5 | 0.5 | 0.5 |
| Amount of water attached (ppm) | 50 | 45 | 60 | 30 | 90 | 250 | 40 | 120 | 45 | 55 |

TABLE 2

| Ingredients | A1 | A2 | A3 | A4 | A5 | A6 | A7 |
|---|---|---|---|---|---|---|---|
| EEA | 95 | 100 | | 95 | 95 | 95 | 95 |
| SEPS | 5 | | | 5 | 5 | 5 | 5 |
| L-LDPE | | | 100 | | | | |
| VTMOS | 45 | 40 | 40 | 100 | 2 | 45 | 45 |
| DCP | 2.16 | 1.92 | 1.92 | 4.8 | 0.5 | 0.2 | 20 |
| Silane-impregnation degree | o | o | x | x | o | o | o |

The starting materials used were as follows:

(1) D9052: Ethylene-α-olefin copolymer/Softlex D9052 (manufactured by NIPPON OIL CO., LTD.), density: 0.905 g/cm$^3$
(2) P-0480: Ethylene-α-olefin copolymer/Tafmer P-0480 (manufactured by Mitsui Petrochemical Co., Ltd.), density: 0.87 g/cm$^3$
(3) Magnesium hydroxide: Kisuma 5B (manufactured by Kyowa Kagaku K. K.), oleic acid-treated product
(4) Quicklime (1): Average particle size: 3 μm, stearic acid-treated product
(5) Quicklime (2): Average particle size: 10 μm, stearic acid treated product
(6) DBTDL: Dibutyltin dilaurate
(7) Antioxidant: Phenol type antioxidant/Irganox 1010 (manufactured by Ciba Geigy)
(8) Lubricant: Low-molecular weight polyethylene/Sunwax 171P(manufactured by Sanyo Kasei Kogyo K.K.)
(9) EEA: Ethylene-ethyl acrylate copolymer (EA content: 23% by weight, crystalline melting point: 93° C.)
(10) SEPS: Hydrogenated styrene-isoprene block copolymer (styrene content: 30% by weight, crystalline melting point: 135° C.)
(11) L-LDPE: Straight chain low-density polyethylene (density: 0.924 g/cm$^3$, MI: 3.0 g/10 min)
(12) VTMOS: Vinyltrimethoxysilane
(13) DCP: Dicumyl peroxide The evaluation methods were as follows:
(14) Amount of water attached (ppm): Karl Fischer method (150° C., 30 minutes)
(15) Silane impregnability: VTMOS/DCP liquid mixture was heated with stirring in a super mixer and the impregnation degree at that time was evaluated.
o: Well impregnated, x: Impossible to impregnate
(16) Extruded tape appearance: 50 mmφ extruder, 120–150–170–180–170° C., L/D: 20, Compression ratio: 3.5, Tape die: 100 mm in width, 1 mmt in lip clearance Evaluation: o>Δ>x and the level of o was determined as "pass".
(17) Oxygen index: According to JIS K 7201
(18) Gel fraction (%): 120° C., 20 hours, xylene immersion method
(19) Tensile strength (MPa) and elongation (%): According to JIS K 6760
(20) Hot set: According to IEC-540A o: Pass, x: Failure The flame-retardant polyolefin obtained and the carrier polymer obtained were mixed in the ratio shown in Tables 3 and 4 and the mixture was extruded through an extruder and then immersed in a warm water to subject the mixture to crosslinking treatment. The resulting extruded tape was used to evaluate gel fraction, tensile strength, elongation and hot set. Moreover, the extruded tape was pressed to be subjected to evaluation of oxygen index.

TABLE 3

| | Example | | | | | Comparative Example | | | |
|---|---|---|---|---|---|---|---|---|---|
| | 1 | 2 | 3 | 4 | 5 | 1 | 2 | 3 | 4 |
| <Ingredients> | | | | | | | | | |
| N1 | 98 | 97.5 | | | | | | | |
| N2 | | | 98 | 97.5 | | | | | |
| N3 | | | | | 98 | | | | |
| N4 | | | | | | 98 | | | |
| N5 | | | | | | | 98 | | |
| N6 | | | | | | | | 98 | |
| N7 | | | | | | | | | 98 |

TABLE 3-continued

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| A1 | 2 | 2.5 |  |  | 2 | 2 | 2 | 2 | 2 |
| A2 |  |  | 2 | 2.5 |  |  |  |  |  |
| <Evaluation item> |  |  |  |  |  |  |  |  |  |
| Tape extrusion appearance | ○ | ○ | ○ | ○ | ○ | ○ | x | x | ○ |
| Oxygen index | 31 | 31 | 32 | 31 | 31 | 21 | 36 | 31 | 30 |
| Gel fraction (%) | 77 | 79 | 76 | 78 | 76 | 71 | 83 | 76 | 78 |
| Tensile strength (MPa) | 14 | 14 | 13 | 14 | 13 | 16 | — | — | 9 |
| Elongation (%) | 330 | 300 | 355 | 320 | 340 | 390 | — | — | 200 |
| Hot set | ○ | ○ | ○ | ○ | ○ | ○ | — | — | x |
| Total evaluation | ○ | ○ | ○ | ○ | ○ | x | x | x | x |

(—: Impossible to measure)

TABLE 4

|  | Comparative Example | | | | | | | |
| --- | --- | --- | --- | --- | --- | --- | --- | --- |
|  | 5 | 6 | 7 | 8 | 9 | 10 | 11 | 12 |
| <Ingredients> |  |  |  |  |  |  |  |  |
| N1 |  |  |  | 98 | 98 | 98 |  |  |
| N2 |  |  |  |  |  |  | 99.8 | 92 |
| N8 | 98 |  |  |  |  |  |  |  |
| N9 |  | 98 |  |  |  |  |  |  |
| N10 |  |  | 98 |  |  |  |  |  |
| A1 | 2 | 2 |  |  |  |  | 0.2 |  |
| A2 |  |  | 2 |  |  |  |  | 8 |
| A5 |  |  |  | 2 |  |  |  |  |
| A6 |  |  |  |  | 2 |  |  |  |
| A7 |  |  |  |  |  | 2 |  |  |
| <Evaluation item> |  |  |  |  |  |  |  |  |
| Tape extrusion appearance | x | ○ | x | x | ○ | x | ○ | x |
| Oxygen index | 31 | 30 | 31 | 29 | 30 | 31 | 30 | 31 |
| Gel fraction (%) | 76 | 59 | 80 | 51 | 52 | 81 | 58 | 82 |
| Tensile strength (MPa) | — | 11 | — | — | 10 | — | 12 | — |
| Elongation (%) | — | 370 | — | — | 390 | — | 390 | — |
| Hot set | — | x | — | — | x | — | x | — |
| Total evaluation | x | x | x | x | x | x | x | x |

(—: Impossible to measure)

As is clear from Table 3 and Table 4, in Examples 1 to 4, the extrusion processability was good and the crosslinking characteristics, mechanical characteristics, flame-retardancy and heat resistance were excellent.

On the other hand, in all the Comparative Examples, extrusion processability, crosslinking characteristics, mechanical characteristics, flame-retardancy and heat resistance and the like were unbalanced.

Industry Applicability

According to this invention, it is possible to obtain a flame-retardant, silane-crosslinked polyolefin excellent in extrusion processability, and also excellent in crosslinking characteristics, mechanical characteristics, flame-retardancy and heat resistance.

What is claimed is:

1. A process for producing a flame-retardant, silane-crosslinked polyolefin, which comprises:

(1) preparing a masterbatch composition (A) which comprises a flame-retardant polyolefin base polymer comprising 100 parts by weight of an α-olefin homopolymer or copolymer having a density of not more than 0.92 g/cm³, 50 to 200 parts by weight of a flame-retardant, 0.5 to 10 parts by weight of a water-absorbing agent having an average particle size of 1 to 5 μm, and a catalytic amount of a silanol-condensing catalyst, (2) preparing a masterbatch composition (B) which comprises a substantially water-free carrier polymer comprising a free-radical generator and an organic unsaturated silane represented by the general formula RR'SiY$_2$ in which R is a monovalent, olefinically unsaturated hydrocarbon group, Y is a hydrolyzable organic group and R' is a monovalent hydrocarbon group other than olefinically unsaturated hydrocarbon groups or the same as Y, (3) reacting the masterbatch composition (A) with the masterbatch composition (B) by melt-mixing at a higher temperature than the crystalline melting point of the base polymer of the flame-retardant polyolefin, and (4) contacting the reaction mixture of the masterbatch compositions (A) and (B) with water to subject the reaction mixture to crosslinking, wherein the carrier polymer is selected from the group consisting of an ethylene-ethyl acrylate copolymer (EEA), an ethylene-methyl methacrylate copolymer (EMMA), a hydrogenated block copolymer obtained by hydrogenating a block copolymer comprising at least one polymer block comprising mainly a vinyl aromatic compound and at least one polymer block comprising mainly a conjugated diene compound, and mixtures thereof, and wherein the amount of the silanol-condensing catalyst, the carrier polymer, the organic unsaturated silane, and the free-radical generator added are 0.01 to 0.1% by weight, 1 to 5% by weight, 0.1 to 2% by weight and 0.01 to 0.1% by weight, respectively each based on the total weight of the flame-retardant, silane-crosslinked polyolefin.

2. The process for producing a flame-retardant, silane-crosslinked polyolefin according to claim 1, wherein the α-olefin homopolymer or copolymer is a homopolymer of an α-olefin selected from the group consisting of ethylene and propylene, a crystalline, block or random copolymer of an α-olefin with at least one other α-olefin, a copolymer of an α-olefin with at least one polar monomer selected from the group consisting of vinyl acetate, maleic anhydride and acrylic acid, or a mixture thereof and has a density of 0.92 g/cm³ or less.

3. The process for producing a flame-retardant, silane-crosslinked polyolefin according to claim 1, wherein the flame-retardant is surface-treated with a silane-coupling agent, a silicone derivative, a fatty acid or a metal of a fatty acid.

4. The process for producing a flame-retardant, silane-crosslinked polyolefin according to claim 1, wherein the flame-retardant is selected from the group consisting of magnesium hydroxide and aluminum hydroxide.

5. The process for producing a flame-retardant, silane-crosslinked polyolefin according to claim 1, wherein the water-absorbing agent is surface-treated with a silane-coupling agent, a silicone derivative, a fatty acid or a metal salt of a fatty acid.

6. The process for producing a flame retardant, silane-crosslinked polyolefin according to claim 1, wherein the water-absorbing agent is quicklime.

* * * * *